US008272074B1

(12) United States Patent
Ashline

(10) Patent No.: US 8,272,074 B1
(45) Date of Patent: *Sep. 25, 2012

(54) HEAD RESTRAINT DEVICE HAVING A SUPPORT MEMBER WITH BACK AND SHOULDER PORTIONS

(75) Inventor: Trevor P. Ashline, Mooresville, NC (US)

(73) Assignee: Simpson Performance Products, Inc., New Braunfels, TX (US)

( * ) Notice: Subject to any disclaimer, the term of this patent is extended or adjusted under 35 U.S.C. 154(b) by 744 days.

This patent is subject to a terminal disclaimer.

(21) Appl. No.: 11/787,532

(22) Filed: Apr. 13, 2007

Related U.S. Application Data

(63) Continuation-in-part of application No. 11/131,782, filed on May 17, 2005, now Pat. No. 7,765,623, which is a continuation-in-part of application No. 10/728,003, filed on Dec. 3, 2003, now Pat. No. 6,931,669.

(60) Provisional application No. 60/797,921, filed on May 5, 2006.

(51) Int. Cl.
   *A42B 7/00* (2006.01)
(52) U.S. Cl. .................................. 2/421; 2/425
(58) Field of Classification Search .............. 2/422, 411, 2/416, 245, 6.2, 6.1
   See application file for complete search history.

(56) References Cited

U.S. PATENT DOCUMENTS

| | | | | |
|---|---|---|---|---|
| 602,609 A * | 4/1898 | Tatro | .............................. | 280/230 |
| 1,144,150 A * | 6/1915 | Marcovsky | ........................ | 2/456 |
| 3,074,669 A * | 1/1963 | Bohlin | .................... | 244/122 AG |
| 3,099,261 A * | 7/1963 | Doss et al. | ........................ | 600/19 |
| 3,134,106 A * | 5/1964 | Shaffer et al. | ..................... | 2/462 |
| 3,148,375 A * | 9/1964 | Jones | .................................. | 2/421 |
| 3,278,230 A * | 10/1966 | Boyce et al. | ................... | 297/465 |
| 3,329,464 A * | 7/1967 | Antony et al. | ................ | 297/465 |
| 3,499,681 A * | 3/1970 | O'Neal et al. | ................ | 297/465 |
| 3,671,974 A * | 6/1972 | Sims | .................................. | 2/421 |
| 3,818,509 A * | 6/1974 | Romo et al. | ....................... | 2/421 |
| 3,873,996 A * | 4/1975 | Varteressian | ..................... | 2/421 |
| 3,900,896 A * | 8/1975 | Ackerman | ......................... | 2/468 |
| 3,925,822 A * | 12/1975 | Sawyer | .............................. | 2/421 |
| 4,219,193 A * | 8/1980 | Newman | .......................... | 482/10 |
| 4,319,362 A * | 3/1982 | Ettinger | .............................. | 2/415 |
| 4,477,041 A * | 10/1984 | Dunne | .................... | 244/122 AG |
| 4,638,510 A * | 1/1987 | Hubbard | ............................ | 2/6.1 |
| 4,909,459 A * | 3/1990 | Patterson | ................ | 244/122 AG |
| 4,923,147 A * | 5/1990 | Adams et al. | ........... | 244/122 AG |
| 4,967,985 A * | 11/1990 | Deakin | ................... | 244/122 AG |
| 5,267,708 A * | 12/1993 | Monson et al. | ......... | 244/122 AG |
| 5,272,770 A * | 12/1993 | Allen et al. | ........................ | 2/421 |
| 5,437,613 A * | 8/1995 | Reggio et al. | .................... | 602/18 |

(Continued)

*Primary Examiner* — Danny Worrell
(74) *Attorney, Agent, or Firm* — Everman Law Firm, PA; Gregory R. Everman

(57) ABSTRACT

A restraint device for controlling the head of a driver during a high-performance vehicle collision. The device includes a support member having a back portion and shoulder portions that extend at least partially over the shoulders of the driver; a tether for attaching the support member to the driver's helmet; and at least one anchor strap attached at one end to the support member and at the other end to the vehicle's seat belt assembly, driver's truck, and/or driver's legs, which serves to anchor the device and oppose forward and rearward movement of the driver's head during a collision event, reducing the likelihood of injury. The shoulder portions are configured to engage the vehicle's shoulder belts, which improves the restraint device's ability to resist forward movement and downward rotation of the driver's head that is caused by a collision event.

19 Claims, 12 Drawing Sheets

U.S. PATENT DOCUMENTS

| | | | |
|---|---|---|---|
| 5,715,541 A * | 2/1998 | Landau | 2/425 |
| 6,009,566 A * | 1/2000 | Hubbard | 2/468 |
| 6,308,345 B1 * | 10/2001 | Williams, Jr. | 2/468 |
| 6,330,722 B1 * | 12/2001 | Betts | 2/416 |
| 6,381,758 B1 * | 5/2002 | Roberts et al. | 2/421 |
| 6,588,022 B1 * | 7/2003 | Anders et al. | 2/421 |
| 6,591,430 B1 | 7/2003 | Sledge | |
| 6,751,809 B1 * | 6/2004 | Cooper et al. | 2/421 |
| 6,810,535 B1 * | 11/2004 | Moloney | 2/411 |
| 6,931,669 B2 * | 8/2005 | Ashline | 2/422 |
| 7,120,982 B2 * | 10/2006 | Downing et al. | 29/401.1 |
| 7,155,747 B2 * | 1/2007 | Baker | 2/422 |
| 7,380,290 B2 * | 6/2008 | Mothaffar | 2/421 |
| 7,395,558 B2 * | 7/2008 | Mothaffar | 2/421 |
| 7,404,402 B2 * | 7/2008 | Yu | 128/857 |
| 7,509,691 B1 * | 3/2009 | Wingate | 2/421 |
| D597,212 S * | 7/2009 | Stiles | D24/191 |
| 7,703,150 B2 | 4/2010 | Wagner et al. | |
| 7,703,152 B2 * | 4/2010 | Rhodes et al. | 2/421 |
| 7,765,623 B2 * | 8/2010 | Ashline | 2/421 |
| 7,823,925 B2 * | 11/2010 | Sargent | 280/808 |
| 2001/0002087 A1 * | 5/2001 | Townsend | 280/801.1 |
| 2002/0043831 A1 * | 4/2002 | Alsup | 297/216.12 |

* cited by examiner

HEAD RESTRAINT DEVICE HAVING A SUPPORT MEMBER WITH BACK AND SHOULDER PORTIONS

CROSS REFERENCE TO RELATED APPLICATIONS

This is a continuation-in part of application Ser. No. 11/131,782, filed May 17, 2005 now U.S. Pat. No. 7,765,623 B2, which is a continuation-in-part of application Ser. No. 10/728,003, filed Dec. 3, 2003, now U.S. Pat. No. 6,931,669 B2, and claims the benefit of U.S. Provisional Application No. 60/797,921, filed May 5, 2006, each of which is hereby incorporated by reference.

BACKGROUND OF THE INVENTION

1. Field of the Invention

The present invention relates to the field of safety devices worn by a driver when operating a high-performance vehicle. More specifically, the present invention relates to a restraint device that controls movement of, and reduces forces applied to, a driver's head, neck and spine when the driver is subjected to high deceleration forces, such as those forces that may occur during a collision event while operating a high-performance vehicle.

2. Description of the Related Art

Traditionally, drivers of high-performance vehicles have employed standard five or six point seat belt assemblies, in which all of the belts tie into a common buckle, to restrain the driver during a collision event. Although standard seat belt assemblies are effective in constraining the torso of the driver to the seat assembly during a collision event, it does not restrain the driver's head or neck. As such, during a frontal or angular frontal impact, the driver's head may continue forward from the seat assembly then violently rotate downward towards the driver's chest as the seatbelts engage and restrict forward movement of the driver's torso. Rear impacts may also cause undesirable movement of the driver's head and neck. For example, the driver's head may rebound off of the seat headrest, then into the aforementioned described forward and downward motion. Further, side impacts may cause the driver's head and neck to tilt sideways, resulting in significant and unequal loading conditions wherein one side of the neck may bear the vast majority of the loading as compared to the opposed side. In the aforementioned impact scenarios, uncontrolled movement of the driver's head and neck, and resulting excessive loading thereto, has resulted in serious injury including death.

Injury may occur during a collision event when the driver's head moves forward and downward until it strikes against an interior component of the vehicle, such as the steering wheel. Additionally, downward rotation of the driver's head may cause elevated tension forces to occur in the spine and neck. Where the tension forces are sufficiently high, a basilar skull fracture may occur, a condition in which the base of the skull cracks from the stem. Finally, during recoil, the occupant's head may be flung rearward against an interior component of the car, typically the seating assembly. Angular and side impacts further compounds the effect of the impact by causing forces to be applied unequally to one side of the neck as compared to the other side.

One proposed approach to reduce these types of injuries was to equip high-performance vehicles with driver-side airbags. However, this approach is problematic in that after the initial impact, the inflated airbag would block the driver's field of vision. Another problem is that the air bags would have to deploy much more quickly and with more explosive force than it would have to with conventional vehicles, due to the greater speeds at which high-performance vehicles are operated.

Other efforts to improve safety for occupants of high-performance vehicles include devices configured to restrain the driver's head and neck during a collision. Five of these devices, sold under the respective marks Hutchens Device®, R-3™, Hutchens II™, Hutchens Hybrid™ and Hans Device® are well known in the racing industry.

The Hans Device® includes a rigid yoke that is worn around the neck and over the shoulders of a driver and to which a safety helmet is tethered. The Hans Device® is configured principally for frontal collisions, being less effective in angular-frontal and side impacts.

Another disadvantage of the Hans Device® is that the structure of the yoke may inadvertently cause the device to become a safety hazard by impeding the driver from quickly exiting the vehicle. With high-performance vehicles, egress is made through the driver-side window frame. However, the stiff and bulky yoke of the Hans Device® may make it more difficult to move and fit through the driver-side window frame. Consequently, valuable time in removing the driver from a dangerous crash site and to treat the driver may be lost. This need to quickly exit the vehicle is particularly critical when the driver and/or vehicle are on fire or when the driver is seriously injured.

A further disadvantage of the Hans Device® is that the driver's seat must be modified in order to accommodate the bulky yoke. Accordingly, the device cannot be used in a vehicle until costly modification to the vehicle's seat assembly has been made.

Still another disadvantage of the Hans Device® is that some drivers consider the bulky yoke as being uncomfortable and that the yoke restricts their mobility when operating the vehicle. Moreover, some drivers have also noted that yoke limits their peripheral view. These limitations of the Hans Device® may potentially lead to driver error. For patents that describe a restraint device having a yoke, see U.S. Pat. Nos. 6,009,566 and 4,638,510, to Robert P. Hubbard.

The Hutchens Device® is a restraint device that is comprised of a series of straps that form a harness which is worn by a driver. The harness is tethered to the driver's helmet at one end and anchored to either the vehicle's seat belt assembly or, in an alternative embodiment, around the driver's legs. See for example, U.S. Pat. No. 6,499,149, to Trevor P. Ashline.

In addition to providing protection to the driver during a collision, the Hutchens Device® overcomes many of the disadvantages of the prior art. For example, the Hutchens Device®, by being configured of flexible straps, is lightweight and does not significantly interfere with a driver's ability to egress a vehicle. As such, the driver may freely exit the vehicle upon uncoupling the vehicle's seat belt assembly.

Moreover, the Hutchens Device® does not require any modification to the vehicle's seat assembly in order to properly function. Accordingly, the device is ready for use upon purchase and is a safety solution affordable to all drivers.

The R-3™ and Hutchens II™ are restraint devices, each having a rigid member positioned along the driver's back, tethers connecting the rigid member to a helmet, and straps connecting the restraint device to an anchor, such as the vehicle's seat belt assembly, for controlling the driver's head and neck during a vehicle collision. (See for example, U.S. Pat. No. 6,931,699 B2 and patent application Ser. No. 11/131,782, each to Trevor P. Ashline). Like the Hutchens Device®, the R-3™ and Hutchens II™ are light-weight, do not significantly interfere with a driver's ability to egress a vehicle, require no modification to the driver's seat assembly prior to use, and allow for a driver to freely exit the vehicle upon uncoupling the vehicle's seat belt assembly.

Notwithstanding the benefits provided by the Hutchens Device®, R-3™, Hutchens II™, and HANS® due to the dangerous nature of operating a high-performance vehicle during a racing event, there is a continual need for providing improved and/or alternative head and neck restraint devices. Such restraint devices should not only provide the benefit of controlling the driver's head and neck during a collision, but should also be simplistic in its use and construction, affordable, not interfere with a driver's ability to operate the vehicle, allow the driver to be released from the vehicle upon merely uncoupling the vehicle's seat belt assembly, and not impede the driver's egress from the vehicle.

BRIEF SUMMARY OF THE INVENTION

To achieve the foregoing and other objects, the present invention, as embodied and broadly described herein, provides various embodiments of restraint device for controlling the head and neck of a driver during a collision event while operating a high performance vehicle.

In an embodiment of the present invention, the restraint device controls a driver's head and neck in the event of a vehicle collision. The restraint device includes a support member having a back portion and shoulder portions that extend at least partially the over the shoulders of the driver; at least one tether that is attached to the support member and is adapted for being attached to a helmet; and at least one anchor strap that is attached to the support member and is adapted for being attached to a vehicle's seat belt assembly. The restraint device cooperates with the seat belt assembly such that the seat belt assembly serves as an anchor to control movement of the driver's head during a vehicle collision event. Also, the vehicle's shoulder belts react against the shoulder portions which improve the restraint device's ability to resist forward and downward movement of the driver's head that may occur during a collision event. Optionally, the tethers are angled inwards and upwards from the support member to the helmet. Also optionally, the anchor strap is attached to the coupling means of the seat belt assembly such that the driver is freed from being secured to the vehicle by releasing the seat belt assembly coupling means. As a further option, the restraint device may further include another anchor strap which anchors the device to the driver's body, such as for example to the driver's torso and/or legs.

In another embodiment of the present invention, the restraint device controls a driver's head and neck in the event of a vehicle collision by anchoring the restraint device to the driver's body. The restraint device includes a support member having a back portion and shoulder portions that extend at least partially the over the shoulders of the driver; at least one tether that is attached to the support member and is adapted for being attached to a helmet; and at least one anchor strap that is attached to the support member and is adapted for being attached to a the driver's body which serves to anchor the device. In this embodiment, the anchor may be the driver's torso and/or legs.

BRIEF DESCRIPTION OF THE DRAWINGS

The above described and other features, aspects, and advantages of the present invention are better understood when the following detailed description of the invention is read with reference to the accompanying drawings, wherein.

DESCRIPTION OF THE PREFERRED EMBODIMENTS

Figure 1:
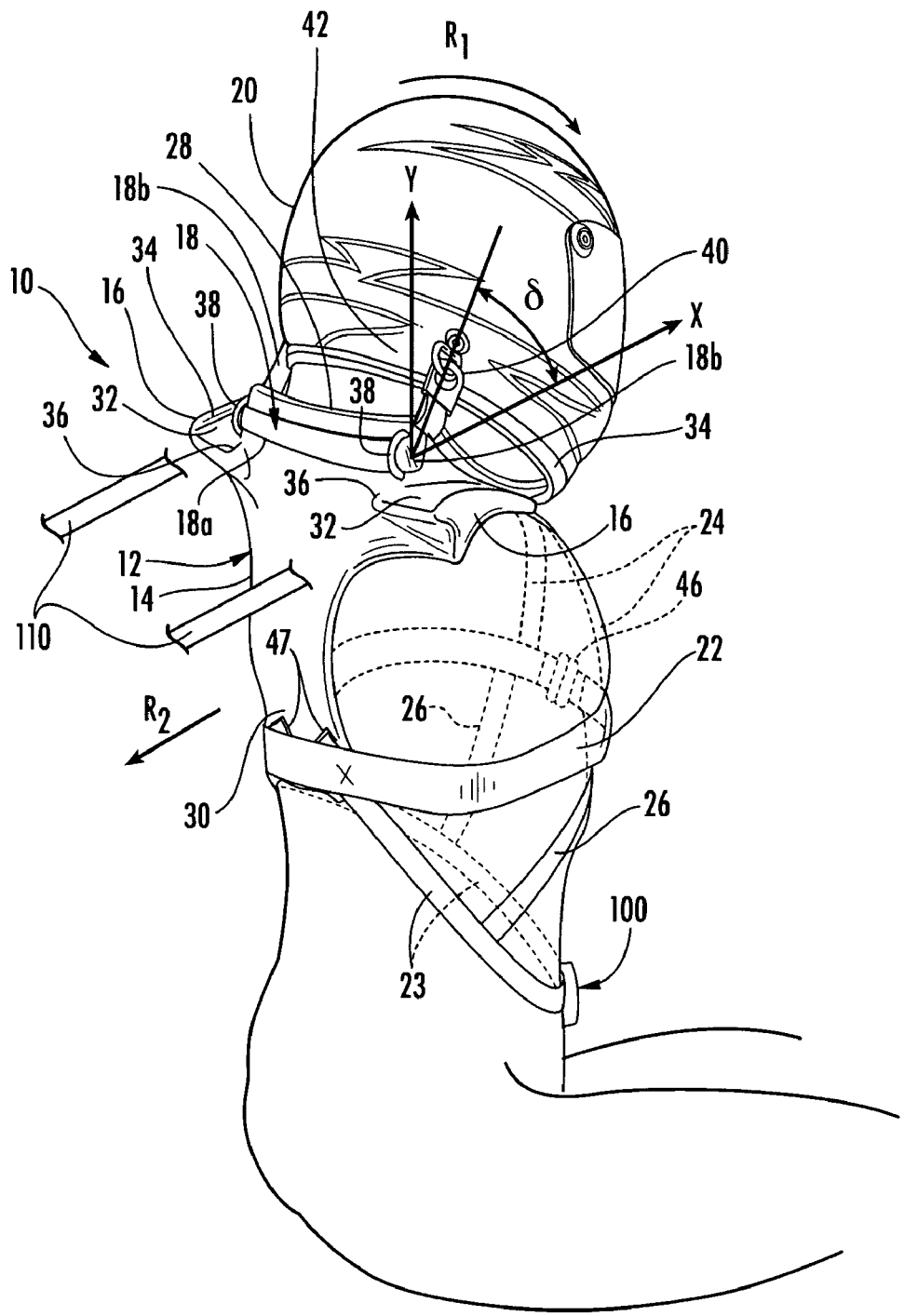
FIG. 1 is a perspective view of the invented head and neck restraint device as positioned on a driver wherein the device includes a support member having back and shoulder portions respectively located along the back and at least partially over the shoulders of the driver, tethers attaching the support member to a helmet, and anchor straps extending forward over the waist for attaching the support member to a vehicle's seat belt assembly, in accordance with an exemplary embodiment of the present invention.

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art. Like reference numbers refer to like elements throughout the various FIGS.

The present invention describes a restraint device that provides protection to a driver's head and neck beyond that offered by just a vehicle's seat belt assembly. During a high-performance vehicle collision, standard 5 or 6 point seat belt assemblies will limit forward advancement of a driver's torso from the vehicle's seat assembly. However, the driver's head, unrestrained, is free to continue forward and caused to rotate about the neck thereby placing large tension loads on the spine and neck. Accordingly, the driver's head may continue forward at a high rate until it impacts against the steering wheel or other interior component of the vehicle, injuring the driver. Furthermore, the downward rotation of the head may place such large loads on the spine and neck that a basilar skull fracture may occur, a condition in which the base of the skull cracks from stress and, typically, also causing trauma to arteries and to the spinal cord. Finally, the driver's head may recoil from its forward position and be flung rearwards into the seat assembly or into another interior component of the vehicle. The above identified concerns are compounded during angular-frontal and side impacts since loading to the driver's neck is unevenly distributed with significantly greater forces being applied to one side of the neck as compared to the opposed side.

In various embodiments, the present invention controls the driver's head and neck when the driver is subjected to large deceleration forces that occur during a high-performance vehicle collision. More specifically, the restraint device opposes the deceleration forces, impeding forward movement and downward rotation of the driver's head and, thereby, decreasing loading to the spine and neck and reducing the likelihood of injury to the driver. By offsetting loading to the driver, the present invention is effective in protecting a driver's head and neck during a collision event. The present invention has utility during frontal, angular frontal, side and rear impacts to the vehicle. The term "driver" as used throughout this specification is to be construed as being inclusive of any person that is an occupant of a vehicle, whether a driver or passenger. The term vehicle is to be broadly construed and includes without limitation racing vehicles, automobiles, boats, motorcycles, go-carts, off-road vehicles, ATVs and aircraft.

In various embodiments, the present invention includes a restraint device having a support member with a back portion positioned along a driver's back and shoulder portions positioned at least partially over the driver's shoulders, at least one tether for attaching the support member to a helmet, and at least one strap for anchoring the device to an anchor, each of which are described in greater detail below. As used herein, the term "anchor" includes a driver's body, such as the driver's legs, hips, waist and/or torso, and/or a component of a vehicle, such as the vehicle's seat belt assembly.

The term "helmet", as used herein, includes any article wearable on a driver's head. For example, and not to be construed as being limiting, "helmet" includes conventional protective head devices such as racing helmets having a hard exterior shell for protecting a driver's head against impact. Helmet also includes articles that do not have a hardened exterior shell, such as a skullcap, an example of which is sold by Speedway Safety Equipment of Hueytown, Ala.

The term "tether", as used herein, includes, without limitation, any tether, webbing, strap, dashpot/dashpot containing a controllable rheological fluid such as that disclosed in US Patent Application Publication No. 2003/0088906 A1 to Gregg S. Baker, belt, cord, chain, cable, rope, band, or the like, that is adapted to attach an embodiment of the invented restraint device to a helmet. Moreover, the term tether includes, without limitation, where the tether is one continuous length having terminal ends available for attaching to a helmet and an intermediate section attached to the support member of the present invention, an example of which is illustrated in FIG. 1; a plurality of tethers, such as for example where separate left and right tethers (not illustrated) attach the support member to the helmet; a network of webbing (not shown) that wraps over a helmet and which attaches to the support member; a strap that attaches a skull cap to the support member; and the other arrangements. It is to be understood that each tether may be comprised of more than one section and that the term tether may include only the tether section that attaches to the support member and/or the entire tethering system that joins the support member to the helmet.

In the various embodiments, the tether is attached to the support member and is capable of being, for being, adapted to be, directly or indirectly, attached to a helmet. The terms "attached", "attaching", "attachable", "attaches" and "attach", as used herein, includes without limitation affixed, coupled, secured, fastened, joined and connected. These terms also include when components are slidably coupled together without being affixed at a specific location, for example if the tether 18 of FIG. 1 was allowed to slide relative to the mechanical clip 34. A non-exhaustive list of articles, means and/or methods for attaching includes mechanical fasteners, clips, straps, rings, adhesive, bonding, hooks, weaving, weaving through a slot in the support member, tying, stitching and encircling, for example.

In the various embodiments, at least one strap is provided for attaching the restraint device to an anchor for controlling a driver's head and neck during a collision event. Also, at least one strap is provided for securing the restraint device to the driver. The term "strap", as used herein, includes without limitation a strap, webbing, belt, cord, chain, cable, rope, band, or the like. It is to be understood that in the embodiments described herein, a singularly illustrated or described strap may be replaced by a plurality of straps, and that any strap may be comprised of a plurality of sections.

Not to be construed as limiting, a preferred construction of the straps and tethers described herein are of polyester webbing, having suitable strength and performance characteristics necessary for operating under the load conditions associated with high-performance vehicle racing. Moreover, each strap and tether may be provided with adjustment means, such as for example a webbing slide adjuster, a 3-bar ring, or other article, for adjusting the length of the strap or tether in order to fit and seat the device properly to a driver.

In the various embodiments described herein, the present invention is light-weight, non-bulky, allows considerable freedom of movement and easily carried on a driver, such that the invented device does not significantly inhibit driver ingress and egress from a vehicle. Moreover, the present invention does not block a driver's field of vision and allows for the driver to rotate his head in order to look in the various directions necessary for racing a vehicle. Furthermore, the present invention allows for the driver to be released from being secured to the vehicle by merely unlatching the vehicle's seat belt assembly.

Figure 2:
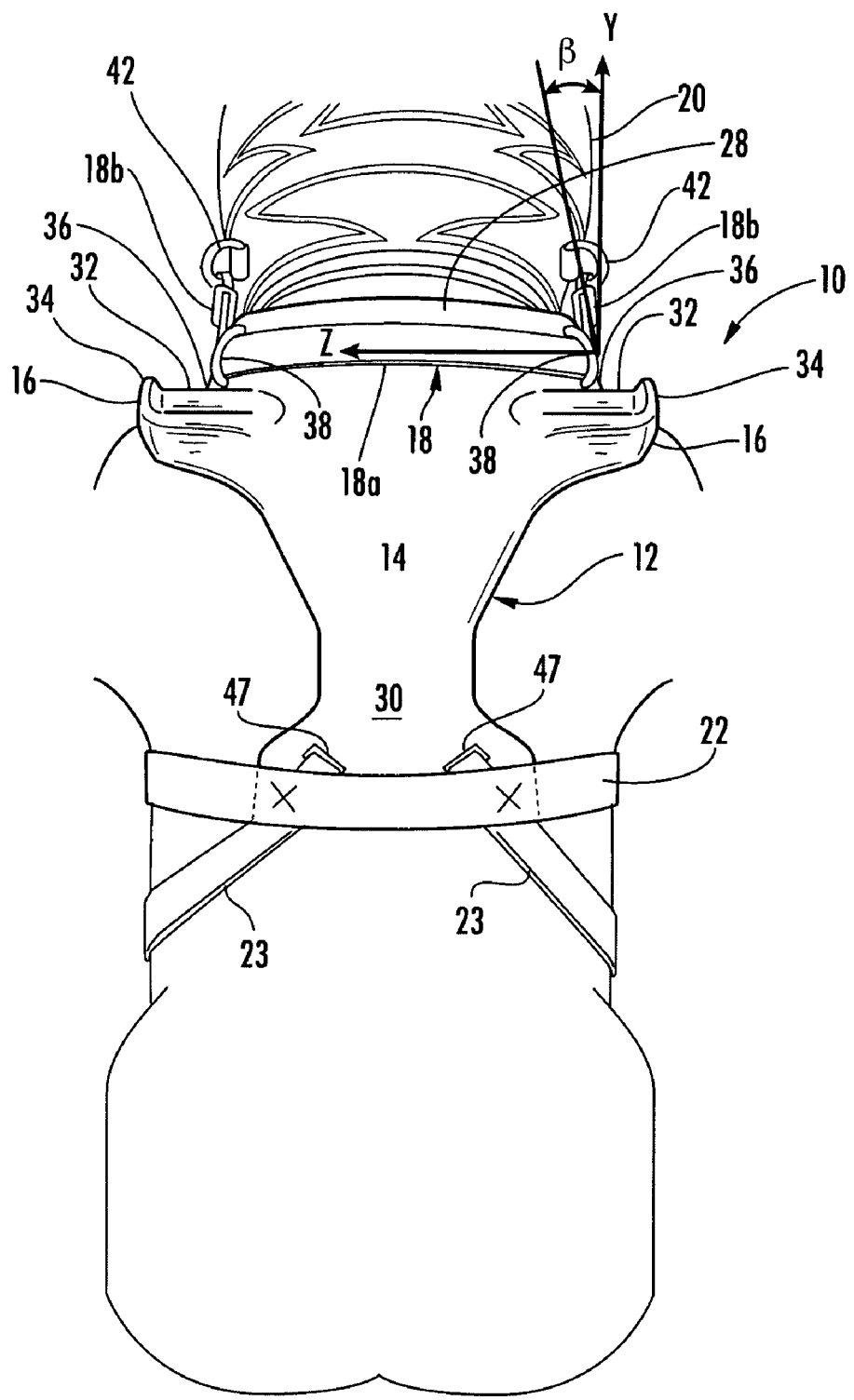
FIG. 2 is a rear, view of the restraint device of FIG. 1.

Referring to the drawings, and particularly FIGS. 1 and 2, the invented restraint device 10 includes a support member 12 having a back portion 14 positionable along a driver's back and shoulder portions 16 positionable over the driver's shoulders; at least one tether 18 for attaching the device 10 to a helmet 20; at least one strap for attaching the device 10 to at least one anchor (e.g. torso anchor strap 22 attaches the device 10 to the driver's torso, and seat belt anchor strap 23 attaches the device 10 to the seat belt assembly 100; and shoulder straps 24 which assist in holding the device 10 in place on the driver. Other straps may be included, such as connector straps 26 which attach the torso anchor strap 22 to the seat belt anchor strap 23 and assist in maintaining positioning of the seat belt anchor strap 23 for attachment to the seat belt assembly 100 as the driver enters the vehicle.

Figure 3:
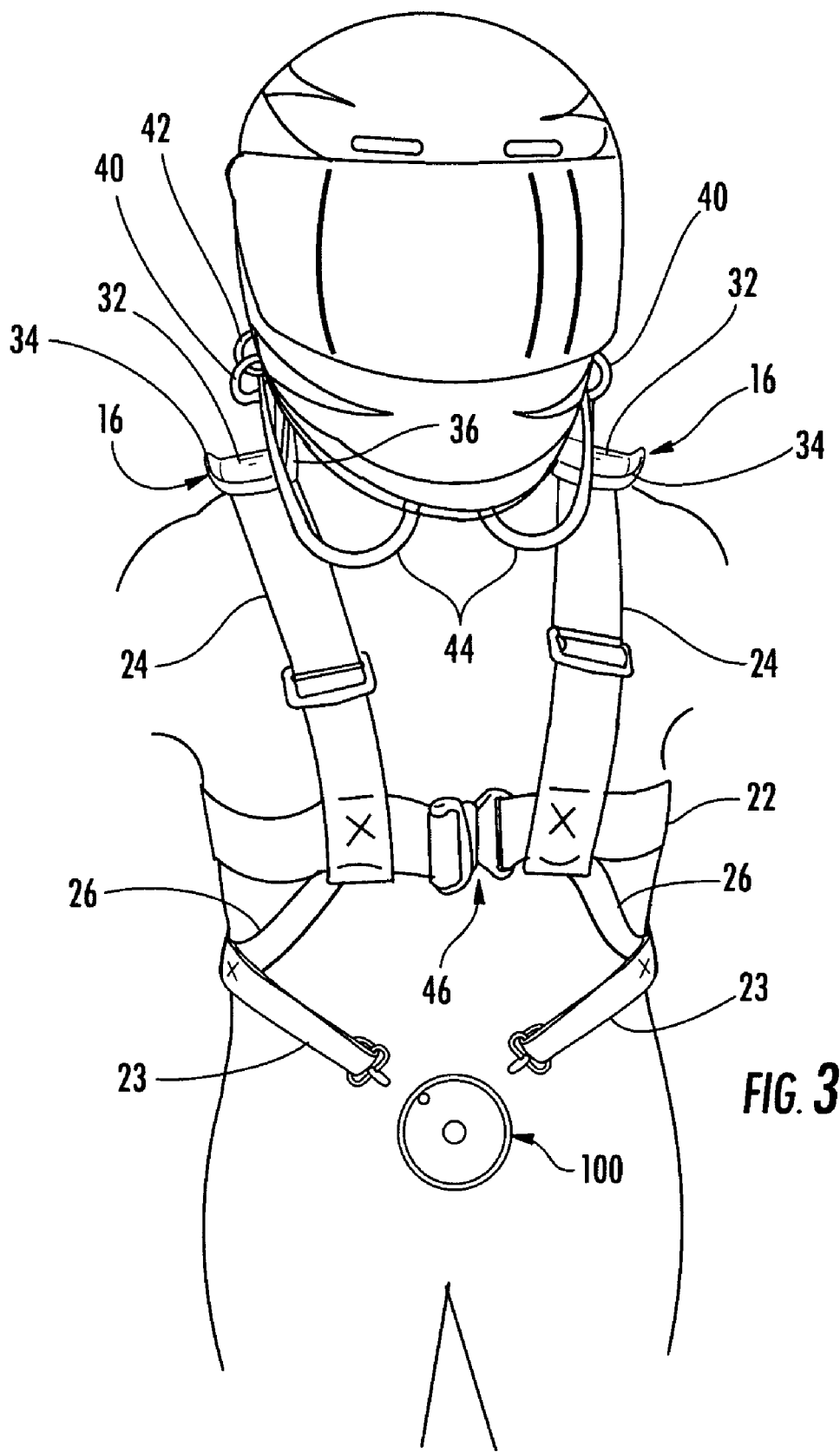
FIG. 3 is a front view of the restraint device of FIG. 2.

The following description of the support member 12 and tether 18, in reference to the embodiment illustrated in FIGS. 1-3, is applicable to each of the other embodiments disclosed herein, such as those illustrated in FIGS. 5-6 and 8-9.

Referring to FIGS. 1 and 2, the support member 12 is configured to be worn on the driver and positions the various straps (e.g. 22, 23 and 24) and tether 18 in relation to the driver. The support member 12, in conjunction with the various straps and anchor(s), control the head and neck of the driver during a collision event and offset the associated forces. In one aspect, the support member 12 provides a rigid structure through which forces are ultimately transferred to the anchor. In another aspect, the support member 12 functions in a cam-like manner to decrease delay and improve responsiveness in opposing deceleration forces, as discussed in greater detail further below.

The length of the support member 12 may vary according to the type of vehicle, racing venue and driver preference. That is, the support member 12 may have a first section 28 that terminates above the driver's head and a second section 30 that terminates below the driver's gluteus maximus, or have a length there-between. In the preferred embodiment, the first section 28 terminates at the back of the driver's neck, below the driver's helmet 20, so that the helmet 20 engages the vehicle's seat assembly headrest and not the support member 12. This preferred upper height limit to the support member 12 advantageously allows for the driver's helmet 20 to engage against the seat assembly headrest upon rebounding during a collision event and makes it easier to egress the vehicle since there is less exposed material to catch on the window frame. Regarding, the second section 30, it preferably terminates near the bottom of the driver's shoulder blades. As such, the preferred total length of the support member 12 is between eight and twelve inches.

As with the length, the support member 12 may also be configured with different widths. Although not to be construed as limiting, preferably the width of the back portion 14 (i.e. not including the shoulder portions 16) of the support member 12 is between two and twelve includes. More preferably, the width of the first section 28 is between five and twelve inches and the width of the second section 30 is between three and eight inches. In an exemplary embodiment, the first section 28 has a width of about eight inches in order to provide suitable placement and angle of the tether 14 to the helmet 20, and the second section 30 is about 3½ A inches in width in order to be positioned between the driver's shoulder blades for comfort purposes. Preferably, the second section 30 has an enlarged terminal end to facilitate positioning and attachment of the anchor straps 22, 23. Additionally, the inner and outer surfaces of the support member 12 may be planar or, more preferably, contoured in order to accommodate the driver's back and seat assembly, respectively, and to provide desired strength characteristics.

Referring to FIGS. 1-3, the shoulder portions 16 extend laterally from, and also forward of, the back portion 14 for being positioned over the shoulders of the driver. The top surface of the shoulder portions 16 have a channel 32 defined between an outer lip 34 and an inner lip 36 partially formed by the first section 28 of the back portion 14. Referring to FIG. 1, the channel 32 is sized to accommodate shoulder belts 110 of the vehicle seat belt assembly and provides an engagement surface against which the shoulder belts 110 react during a collision event. In the preferred embodiment, the channel 32 is slightly curved to more evenly distribute loads that occur when the shoulder belts 110 react there-against. It is to be understood that the shoulder portions 16 may have various configurations including extending: rearward of the back portion 14, over the shoulder, forward of the shoulder and/or over the shoulder and downward over the upper torso of the driver. However, in balancing performance, comfort and practical concerns such as modification to the seat assembly, it is preferred that the shoulder portions 16 do not extend rearward of the back portion 14 or, if so, only by a modest amount so that modification to the seat assembly is not required. Additionally, the shoulder portions 16 preferably terminate prior to the driver's clavicle, whereby it does not extend on or over the clavicle. More preferably, the shoulder portions 16 are positioned on top of the trapezius muscles while terminating prior to the clavicle.

The support member 12 is rigid and has sufficient strength in order to maintain structural integrity while resisting force loads during a collision event. It is to be understood the term rigid means principally rigid and is inclusive of a minor amount of flexibility as the support member 12 may exhibit some resiliency due to significant loads being placed thereon. Notwithstanding, it is preferred that the support member 12 has minimal or no elasticity in order to better control the driver's head and neck during a collision event and to minimize any rebounding effect.

The support member 12 is preferably constructed of a light-weight, high-strength material having sufficient rigidity, such as plastic or more preferably carbon fiber. A nonexhaustive list of other materials that may yield a high-strength, rigid construction includes metal, composites and fiberglass. The inner surface of the support member 12 may be provided with a cushion, padding, gel pad, fabric, or the like, in order to comfort the driver from the rigid support member 12.

For each embodiment of this application, at least one tether 18 is provided for releaseably attaching the restraint device 10 to a helmet 20. For example and as illustrated in FIGS. 1 and 2, attachment there-between may be accomplished by a single tether 18 having an intermediate portion 18a attached to the support member 12 via mechanical clips 38 and opposed end portions 18b equipped with quick release clips 40 for being attached to the helmet 20. Although the single tether 18 may be allowed to slidably move relative to the mechanical clips 38, it is preferred that the tether 18 is affixed by the clips 38 to the support member 12. In another example (not illustrated), the single tether 18 may be replaced with two separate tethers, each affixed at one end to the support member 12 by a mechanical clip (e.g. 38) or the like and adapted at the opposed end for being attached to the helmet 20. That is, the two tether would take be in the same positions as tether end portions 18b. In still another example (not illustrated), a single tether may extend from the support member 12 and attach to only one location at the back of the helmet 20. In a still further example (not illustrated), a multitude of tethers may be provided for attaching the support member 12 to the helmet 20 a plurality of locations. In each of the above examples, a webbing tie, or other means, may be provided on the tether for length adjustment as necessary.

The specific location of tether attachment to the support member 12 and helmet 20, and its path angle there-between, is based upon several factors, for example the number tether being used, the type of vehicle and seat assembly. Notwithstanding, exceptional results were obtained in controlling the driver's head and neck and offsetting deceleration forces during frontal, angular frontal and side impacts, by attaching the tether 18 so that its left and right end portions 18b angle upwards and forwards from the support member 12 to the helmet 20 during normal operation. In describing the tether angle δ, the angle δ is being considered as if the driver is in an upright seated position. By angling the left and right tether portions 18b upwards and forward, the tether portions 18b are in position to quickly resist forces that occur during a frontal or angular frontal impact and control the driver's head and neck. That is, in the event of an impact, the angle δ of the tethers portions 18b may cause slack to be taken-up rapidly and provides force paths that more directly oppose the deceleration forces. Not to be construed as limiting, a preferred upward and forward angle δ is in the range of 30 to 40 degrees.

It is also preferred to angle β the left and right tether end portions 18b inwards from the support member 12 to the helmet 20. By angling the left and right tether portions 18b inwards, the tether portions 18b are in position to quickly resist forces that occur during a side or angular frontal impact and control the driver's head and neck. That is, in the event of an impact, the angle β of the tethers portions 18b may cause slack to be taken-up rapidly and provides force paths that more directly oppose the deceleration forces.

As it will be appreciated by those skilled in the art, where two separate tethers are used instead of the single tether 18, the separate tethers preferably extend from the support member 12 to the helmet 20 in the same upward and forward angle δ, and the same inward angle β, as the aforementioned described the left and right end portions 18b.

Referring to FIGS. 1-3, the quick release clips 40 provide releaseable attachment to D-rings 42 mounted on the helmet 20. This arrangement allows for the restraint device 10 to be quickly released from the helmet 20 by pulling clip lines 44 (FIG. 3), thereby opening the quick release clips 40 for detachment from the helmet D-rings 42. It is noted that the clip lines 44 may be taped to the chin portion of the helmet 20, as shown, in order to quickly locate the lines 44 as needed, and to avoid the lines from becoming inadvertently entangled in the seat belt assembly or restraint device 10.

Referring to FIGS. 1-3, the anchor strap includes the torso anchor strap 22 and/or seat belt anchor strap 23, which anchors the device to the driver's upper torso and seat belt assembly. The restraint device 10 may be configured without the torso anchor strap 22 or the seat belt anchor strap 23, however the utilization of both in combination yield superior results.

The torso anchor strap 22 is preferably attached to the second section 30 of the support member 12, having sufficient length to encircle the driver's torso about the chest. Opposed terminal ends of the torso anchor strap 22 are releaseably coupled together by complementary tongue and buckle assembly 46 or other suitable means, which may be adjusted to ensure a snug fit to the driver.

The torso anchor strap 22 anchors the restraint device 10 to the driver's torso, whereby deceleration forces that cause the driver's head to move in a forward and downward direction (illustrated in FIG. 1 by arrow labeled $R_1$) are transferred through the support member 12, then torso anchor strap 22, for being resisted by the driver's mass.

Referring to FIGS. 1 and 3, the restraint device 10 also includes shoulder straps 24 that attach the shoulder portions 16 to the torso anchor strap 22. The shoulder straps 24 assist in maintaining the restraint device 10 in operational position during a collision event and provide pathways along the front of the driver through which forces are directed to the torso anchor strap 22.

Figure 4A:
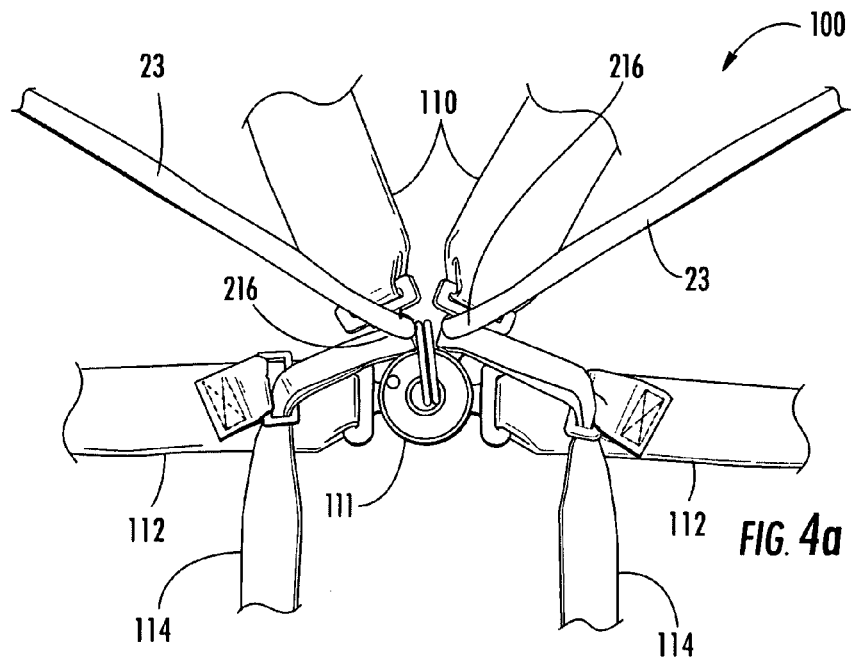
FIG. 4a is a fragmented front view of the restraint device of FIG. 1, showing in particular an arrangement for anchoring the device to the vehicle's seat belt assembly, wherein the anchor straps are secured to the seat belt assembly by shoulder belts.
Figure 4B:
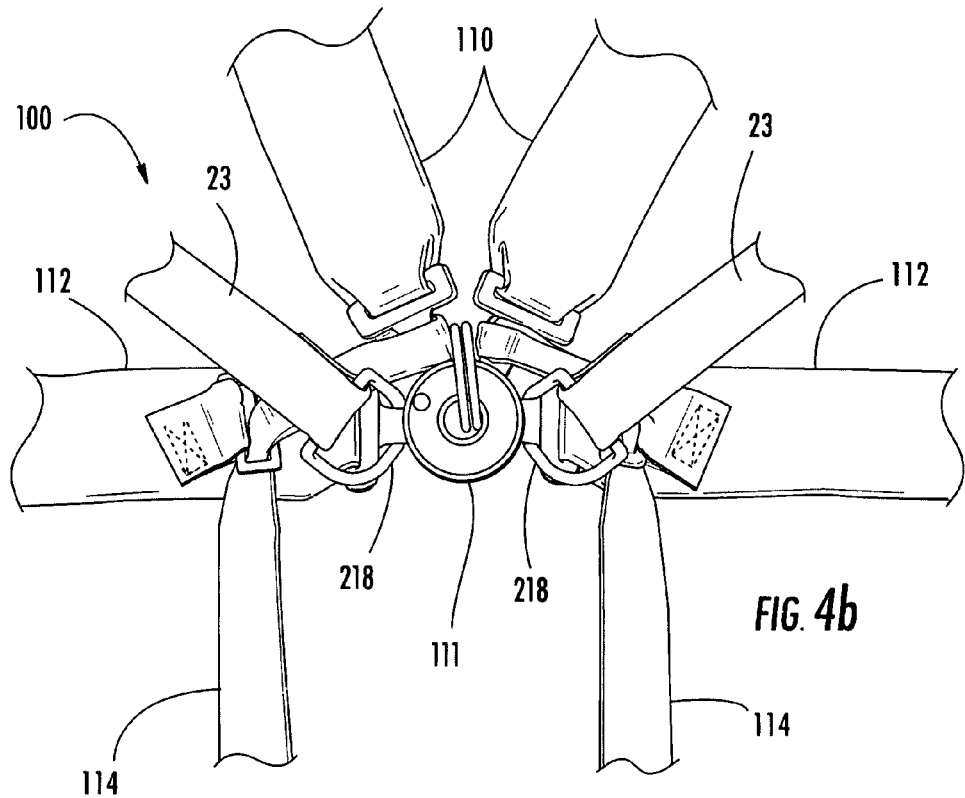
FIG. 4b is a fragmented front view of the restraint device of FIG. 1, showing in particular another arrangement for anchoring the device to a vehicle's seat belt assembly, wherein the anchor straps are secured to the seat belt assembly by a lap belt.
Figure 4C:
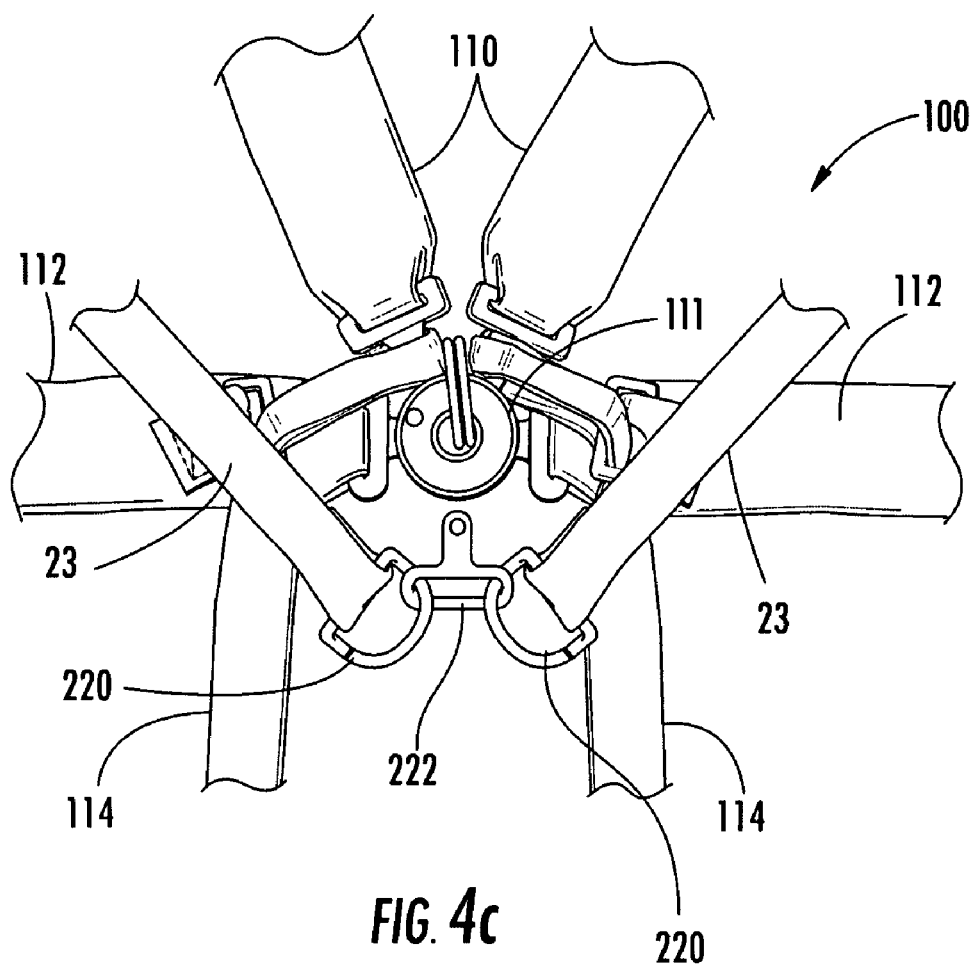
FIG. 4c is a fragmented front view of the restraint device of FIG. 1, showing in particular still another arrangement for anchoring the device to the vehicle's seat belt assembly, wherein the anchor straps are secured to the seat belt assembly by being clipped into a camlock.

Referring to FIGS. 1 and 2, the seat belt anchor strap 23 is configured for anchoring the device 10 to the vehicle's seat belt assembly 100 (FIGS. 4a-4c). In the preferred embodiment, the anchor strap 23 is comprised of two straps 23, each attached at one end to the support member 12 by being passed through respective slots 47, and having a second end that extends around respective left and right sides the driver's waist for being attached to the seat belt assembly 100. In an alternative embodiment (not illustrated), a single seat belt anchor strap is utilized instead of the illustrated two separate straps. In this alternative configuration, the single seat belt anchor strap has an intermediate portion that extends between the slots 47, and opposed end portions that extend forward over the driver's waist to the seat belt assembly 100 in the same fashion as the aforementioned separate anchor straps 23.

Referring to FIG. 3, a pair of optional connector straps 26 may be provided, attached at one end to the torso anchor strap 22 at the other end to the seat belt anchor strap 23. The connector straps 26 assist in maintaining positioning of the seat belt anchor strap 23 for attachment to the seat belt assembly 100 as the driver enters the vehicle. The connector straps 26 may also be part of a pathway for distribution forces during an impact to the anchors (mass of drive and seat belt assembly 100). That is, during a impact event, forces being transmitted through the shoulder straps 24 may be transmitted i) through torso anchor strap 22 for being anchored by the driver's torso, and also ii) through the torso anchor strap 22, connector straps 26 and seat belt anchor strap 23 for being anchored by the vehicle's seat belt assembly 100. These pathways through which forces are transferred are referred herein as secondary pathways, since these are not the pathways principally utilized during for opposing deceleration forces and control the driver's head during an impact.

The device 10 also provides principal pathways, wherein deceleration forces transmitted to the support member 12 are directly transferred to the torso anchor strap 22 and seat belt anchor strap 23 and anchored by the driver's body and seat belt assembly 100, respectively. The combination of secondary and principal pathways allow forces to be transferred along the front and rear of the driver, by a variety of paths, to at least one anchor, thereby controlling the driver's head and neck under a variety of impact conditions.

FIGS. 4a-4c are exemplary of different ways in which the seat belt anchor strap 23 may be attached to the seat belt assembly 100. The illustrated seat belt assembly 100 is a standard five or six point seat belt assembly 100 commonly used in high-performance vehicle racing for securing a driver to the seat assembly and includes a coupling means, such as a cam lock 111, to secure the various belts. As it will be appreciated by those skilled in the art, in each embodiment herein, the driver is released from attachment to the vehicle by merely decoupling the vehicle's seat belt assembly. It is to be understood that the examples provided herein are not exhaustive and merely illustrative of preferred arrangements and, hence, the teachings are applicable to other seat belt assemblies and to other coupling means, for example buckles as commonly used in the racing industry.

Referring to FIGS. 4a-4c, the seat belt assembly 100 comprises shoulder belts 110, lap belts 112 and sub-belts 114 for securing a driver to the seat belt assembly 100. Each of the belts 110, 112, 114 has a tongued end for releaseably attaching the respective belt to the cam lock 111.

In the example illustrated by FIG. 4a, the seat belt anchor strap 23 has looped ends 216 through which tongues of the shoulder belts 110 may be received. As such, by securing the shoulder belts 110 to the cam lock 111, the strap 23 is also secured to the seat belt assembly 100. Likewise, the anchor strap 23 is detached from the seat belt assembly 100 by releasing the seat belts from the cam lock 111.

In the example illustrated by FIG. 4b, the seat belt anchor strap 23 is provided with D-rings 218 through which the lap belts 112 may be received. Accordingly, by securing the lap belt 112 to the cam lock 111, the strap 23 is also secured to the seat belt assembly 100.

Referring to FIG. 4c, another example is provided wherein the anchor strap 23 is attached to D-rings 220, which are coupled to a common tongue 222. The tongue 222 may be attached into the cam lock 111 in order to secure the strap 23 to the seat belt assembly 100.

In each of the above described attachment arrangements, the anchor strap 23, and thus the restraint device 10, is detached from the vehicle by simply uncoupling the seat belts from the cam lock 111.

Figure 5:
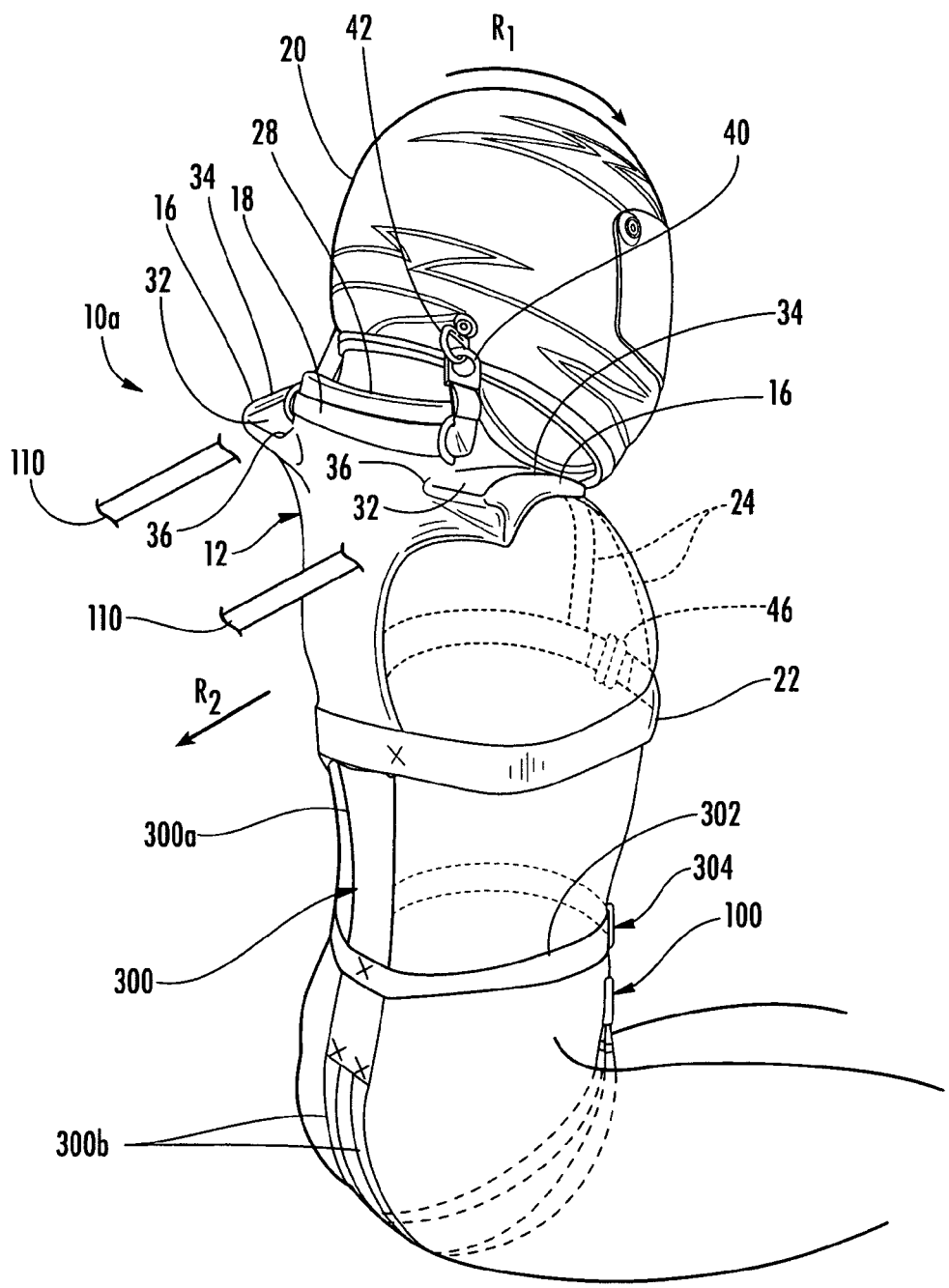
FIG. 5 is a perspective view of another embodiment of the invented head and neck restraint device as positioned on a driver, wherein the device is similar to that described in accordance with FIG. 1, but having anchor straps that extend between the driver's legs for attaching the support member to the vehicle's seat belt assembly, in accordance with an exemplary embodiment of the present invention.
Figure 6:
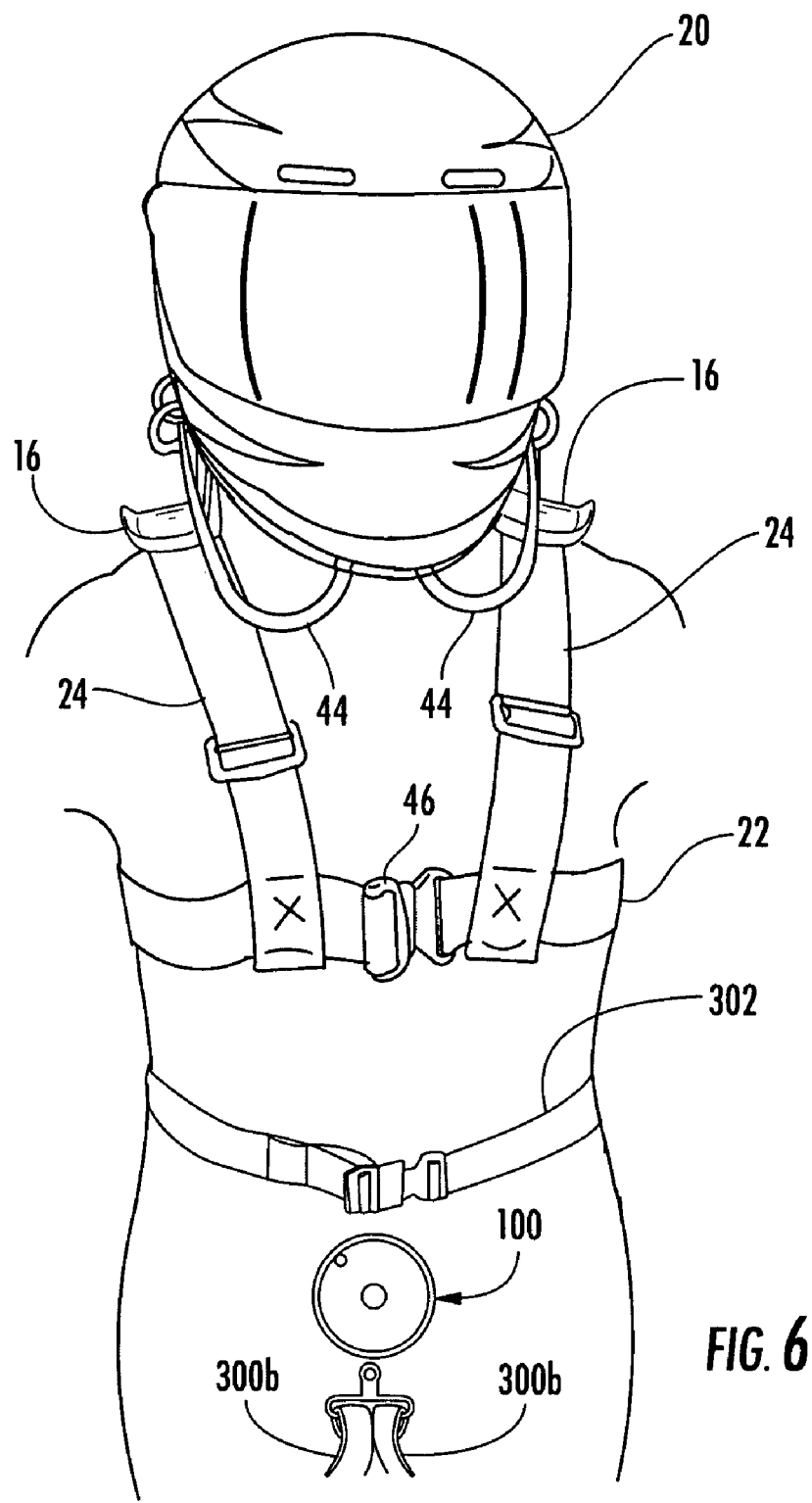
FIG. 6 is a front view of the restraint device of FIG. 5.

Referring to FIGS. 5 and 6, another embodiment of the restraint device 10a is illustrated, having the same support member 12, tethers 18, torso anchor strap 22 and shoulder straps 24 as described in reference with FIGS. 1-3, but wherein the seat belt anchor strap 300 has a first section 300a that is attached to the support member 12 and positioned along the back of the driver, and a second section 300b that passes upwards between the driver's legs to the seat belt assembly 100. A waist strap 302 may also be provided for maintaining the seat belt anchor strap 300 in proper position on the driver. Complementary buckles 304 may be provided for coupling and tightening the waist strap 302 around the driver's waist.

Figure 7A:
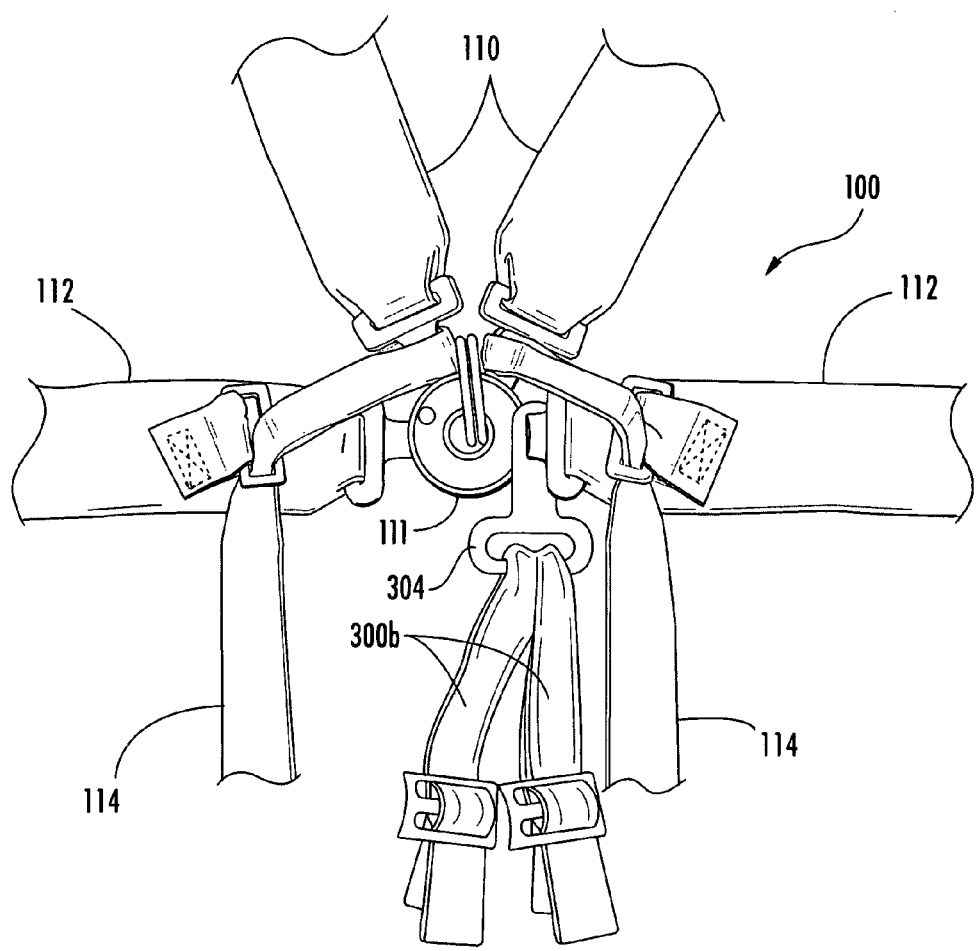
FIG. 7a is a fragmented front view of the restraint device of FIG. 5, showing in particular an arrangement for anchoring the device to the vehicle's seat belt assembly, wherein the anchor strap is secured to the seat belt assembly by a lap belt.
Figure 7B:
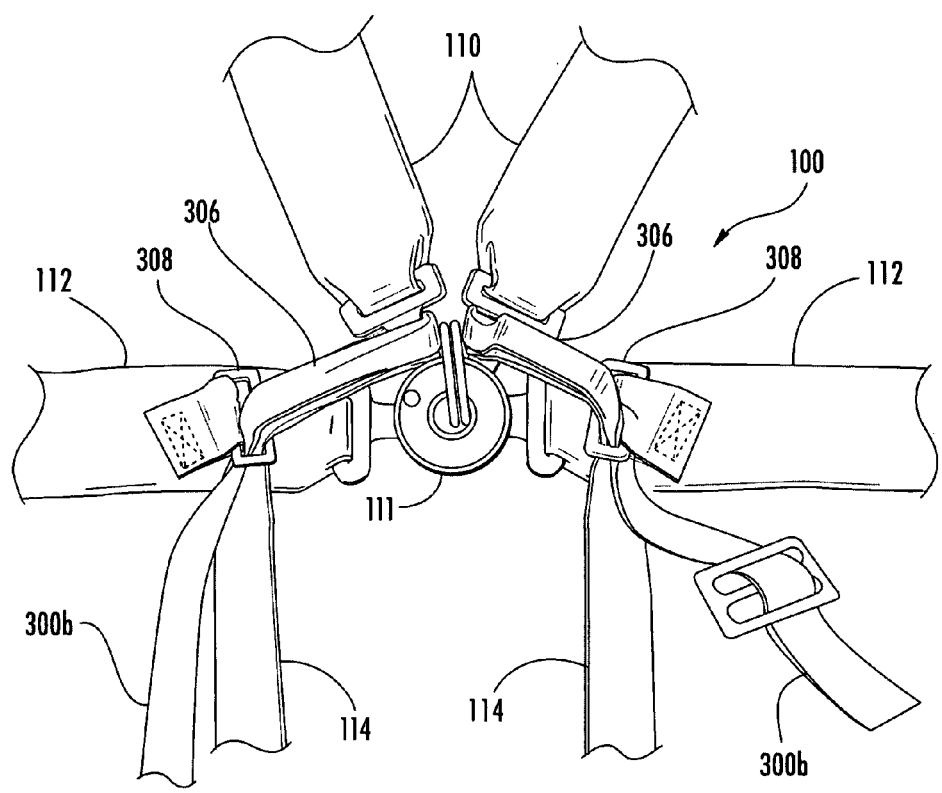
FIG. 7b is a fragmented front view of the restraint device of FIG. 5, showing in particular still another arrangement for anchoring the device to a vehicle's seat belt assembly, wherein the anchor strap is secured to the seat belt assembly by shoulder belts.
Figure 7C:
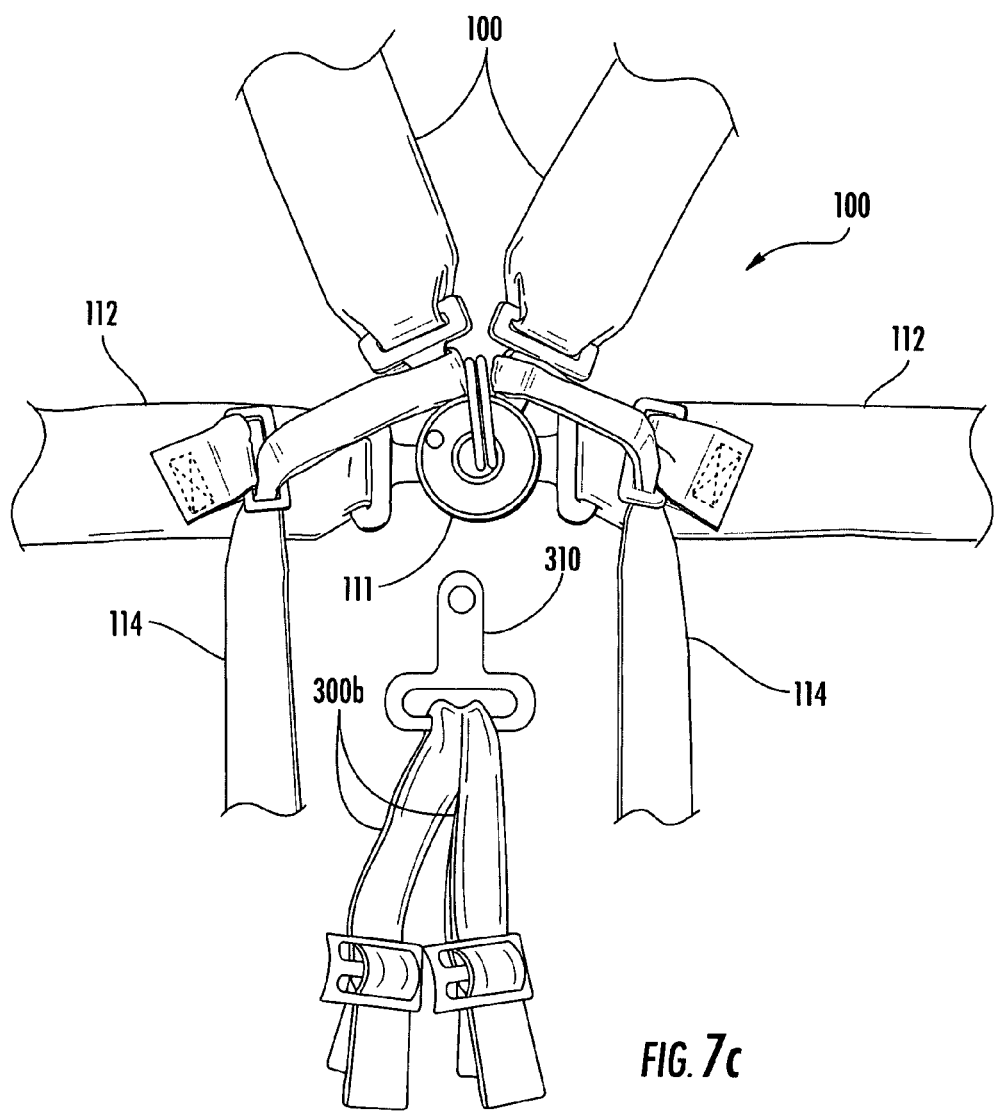
FIG. 7c is a fragmented front view of the restraint device of FIG. 5, showing in particular another arrangement for anchoring the device to the vehicle's seat belt assembly, wherein the anchor strap is secured to the seat belt assembly by being clipped into a camlock.

Preferably, the second section 300b of the anchor strap 300 may be bifurcated to allow for the anchor strap 300b to be spaced from the groin it passes between the driver's legs. The strap's second section 300b is provided with suitable means, such as a loop, ring, clip, tongue, or the like, for releaseably attaching to the vehicle's seat belt assembly 100 (FIGS. 7a-7c). Length adjustment of the strap 300 may be accomplished by a webbing tie, or other suitable means.

FIGS. 7a-7c are exemplary of different ways in which the seat belt anchor strap 300 may be attached to the seat belt assembly 100. For example, and as illustrated by FIG. 7a, the second section 300b of the anchor strap 300 (FIG. 5) is attached to a common tongue 304 through which a tongue of one of the lap belts 112 may be received. Accordingly, by securing the lap belt 112 to the cam lock 111, the strap 300 (FIG. 5) is also secured to the seat belt assembly 100. An article (not shown) may be provided for spacing the end sections apart in order to ensure comfort to the driver as the strap's second section 300b (FIG. 5) passes along the groin.

Referring to FIG. 7b, another example is provided wherein the anchor strap's second section 300b has looped ends 306 through which tongues of the shoulder belts 110 may be received. As such, by securing the shoulder belts 110 to the cam lock 111, the strap 300 (FIG. 5) is also secured to the seat belt assembly 100. The second section 300b of the anchor strap may be routed through optional rings 308 provided on the lap belts 112 in order to space the end sections apart in order to comfort the driver as the strap's second section 300b (FIG. 5) passes along the groin.

Referring to FIG. 7c, still another example is provided wherein the end sections of the anchor strap's second section 300b are tied into a tongue 310. The tongue 310 may be attached into the cam lock 111 in order to secure the strap 300 (FIG. 5) to the seat belt assembly 100.

Figure 8:
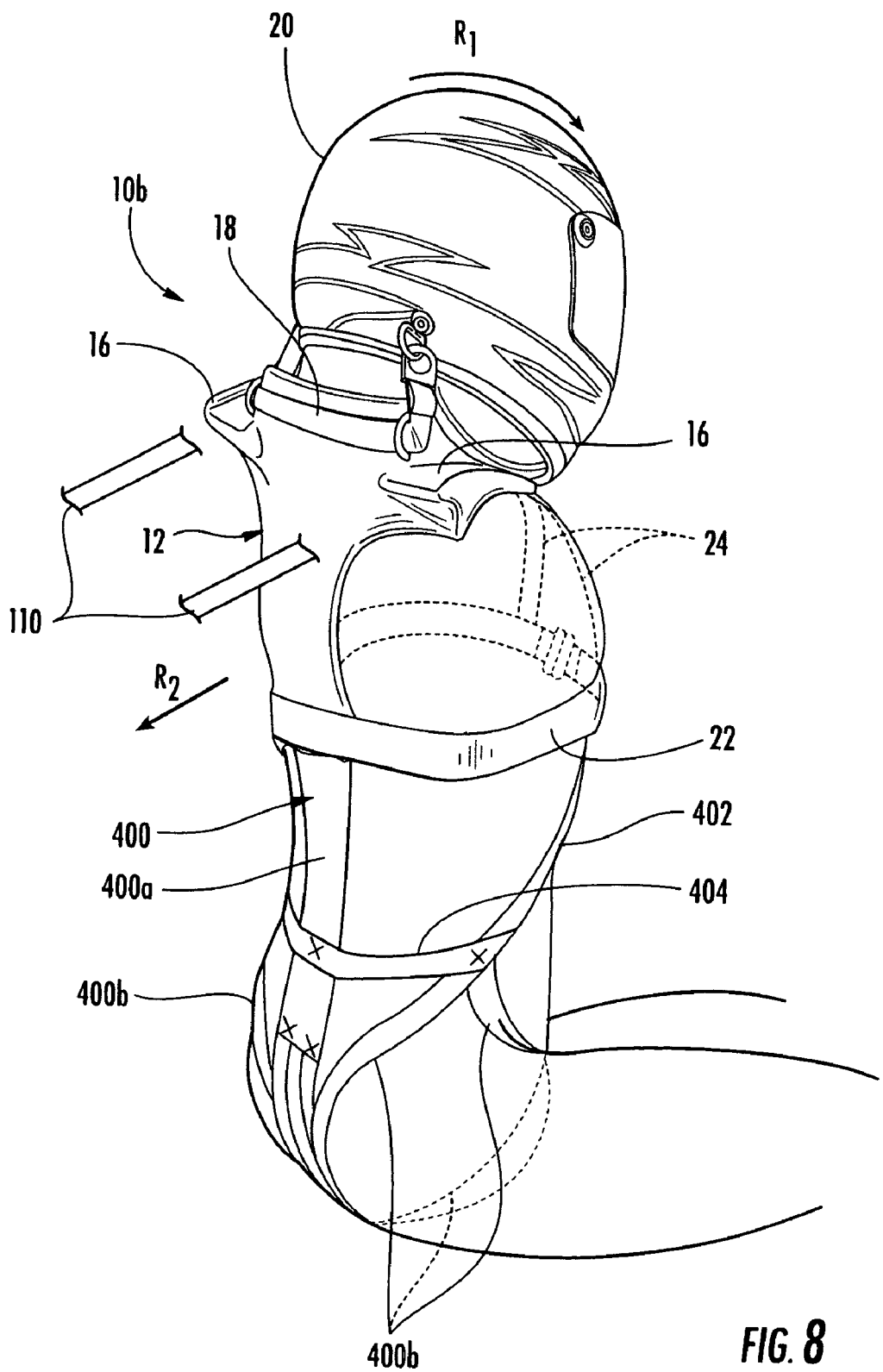
FIG. 8 is a perspective view of another embodiment of the invented head and neck restraint device positioned on a driver, wherein the device is similar to that described in accordance with FIG. 1, but having an anchor strap that extends down the driver's back and loops around the driver's legs, in accordance with an exemplary embodiment of the present invention.
Figure 9:
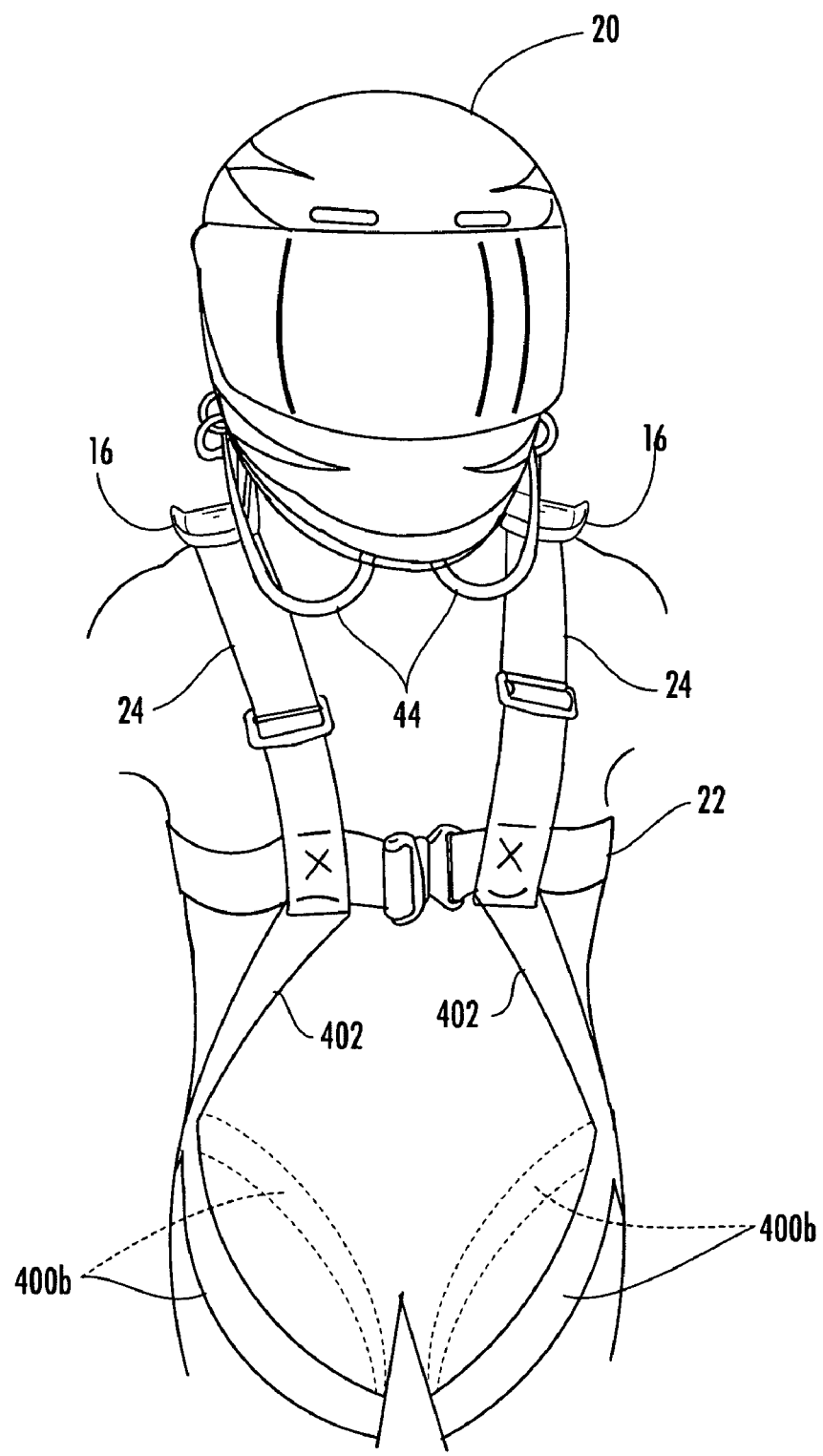
FIG. 9 is a front view of the restraint device of FIG. 8.

Referring to FIGS. 8-9, a further embodiment of the restraint device 10b is illustrated, having the same support member 12, tethers 18, torso anchor strap 22 and shoulder straps 24 as described in reference with FIGS. 1-3, but wherein an anchor strap 400 includes a first section 400a positioned along the back of the driver and a second section 400b that form leg straps that encircle the driver's legs, whereby the mass of the driver's legs serve to at least partially anchor the device 400 (the driver's torso also acts as an anchor due to the torso strap 22). Also included are frontal straps 402 extending from the torso anchor strap 22 or shoulder straps 24 to the second section 400b for providing a force pathway there-from to the leg straps 400b. A full, or partial waist strap 404 as illustrated, may be provided for maintaining placement of the anchor and frontal straps 400, 402.

Each leg strap 400b is preferably provided with means to allow adjustment and/or coupling around the driver's legs. For example, the second sections 400b may each be secured and tightened to the driver's legs by a complementary tongue and buckle assembly (not illustrated).

The location at which the leg straps 400b encircle the driver's legs may vary. For example, FIGS. 8-9 illustrate that second sections 400b being positioned high on the driver's hips, along the hamstring-gluteus maximus interface, along the inner thigh, then over the upper thigh and completing the loop at the driver's hips. As another example (not shown), the leg straps 400b may be positioned lower on the driver legs such that the straps 400b are essentially positioned around the upper thigh of the driver's legs without encompassing the hip area.

It is to be understood that the teachings of the various embodiments may by used in a single restraint device. That is, a restraint device (not illustrated) may be anchored by a combination of any or all of the aforementioned means.

Any of the previous embodiments of the restraint device may be integrated into a racing vest or suit. The vest allows for the restraint device to be easily carried on the driver and may accommodate additional safety equipment such as padding or shielding against impact to the driver's kidneys. A suitable racing vest is described in U.S. patent application Ser. No. 10/728,003 to Trevor P. Ashline, which is incorporated herein by reference.

Also, any of the embodiments described herein may be releaseably carried by the driver's seat by hood and loop material, such as Velcro®, so that the device may remain in position for use in the vehicle while the driver enters or exits the vehicle. Once inside the vehicle, the driver attaches the device to the helmet and to the anchor. If a frontal collision were to occur, the device would release from the seat and be carried forward on the driver where it functions to control movement of the driver's head and neck. Examples of means for releaseably attaching the restraint device to the driver's seat are described in U.S. patent application Ser. No. 10/728, 003 to Trevor P. Ashline.

In use, and referring to FIG. 1, the restraint device is positioned on the driver with the support member 12 disposed along the back and on the shoulders of the driver, the tether 18 attached to the helmet 20, the torso strap 22 secured about the driver's chest, and the anchor strap 18 attached to a second anchor, which in this embodiment is the vehicle's seat belt assembly 100. The restraint device 10 is then seated to the driver by adjusting the tethers 14 and/or straps, as necessary. The seat belt assembly 100 is latched, securing the driver to the seat assembly.

In this secured position, the tether 18 has enough slack so that the driver may sufficient pivot his head for range of vision and to operate the vehicle. In the case of using a dashpot, slack may not be necessary as the driver remains free to move his head during normal driving conditions, but upon a collision the dashpot will become fixed in length in order to restrain the driver's head.

Upon a frontal collision, the driver's body initially continues forward, relative to the seat assembly, as the belts of seat belt assembly 100 stretch against the load and restrain continued forward movement of the driver's torso. Meanwhile, the restraint device 10 is carried forward on the driver and the vehicle's shoulder belts 110 engage and react against the shoulder portions 16, applying a downward and rearward force on the support member 12. The engagement of the shoulder belts 110 against the shoulder portions 16 improves the restraint device's ability to resist forward movement and downward rotation of the driver's head that is caused by a collision event and operates to reduce the amount of tension loading in the driver's neck that may otherwise occur. As the seat belt assembly slows and stops of the driver's body, the driver's head continues forward and downwards a short distance (in the direction of $R_1$) before slack in the tether 18 is taken up. The tether 18, once tensioned, opposes continued forward movement and downward rotation of the driver's head by transferring loads through the support member 12 to seat belt assembly 100 and driver's torso. (Regarding the embodiment illustrated by FIG. 3, loads are anchored by the driver's legs and torso). Additionally, as the tension in the tethers 14 increase, the first section of the support member 12 is caused to rock forward (in the direction of $R_1$) thereby forcing the support member second section to move outward from the driver's body (in the direction of $R_2$). This cam-like action causes the straps, including the anchor strap 18 to tension quicker, providing an increased response in opposing forward and downward movement of the driver's head.

In this manner, the rate of forward and downward movement of the driver's head is slowed and more controlled in comparison to a frontal collision occurrence without use of the restraint device 10. Accordingly, by controlling the driver's head, the likelihood of injury to the driver is decreased.

As it will be also appreciated by those skilled in the art of high-performance vehicle safety devices, the various embodiments described herein each function in a similar manner. That is, forward movement and downward rotation of the driver's head is opposed by transferring loads through the tether 14, support member 12, the anchor strap to an anchor (for example, the driver's legs, torso and/or seat belt assembly depending on the embodiment). With regards to the embodiment(s) illustrated and described in reference to FIGS. 8 and 9, utilizing the driver's legs as anchors advantageously provides driver's with an option for head and neck protection that would otherwise be unavailable in certain vehicles, such as for example go-carts, that do not have a seat belt assembly.

For each embodiment herein, advantageously, if a collision does occur, no additional acts by the driver or racing crew are required in order for the driver to egress the vehicle beyond that necessary by a driver not wearing the restraint device. That is, whether the restraint device is anchored to the driver or to the seat belt assembly 100, the driver and the restraint device are freed from being secured to the vehicle by merely unlatching the seat belt assembly and, thereafter, may egress the vehicle in a conventional manner. If greater freedom of head movement is desired in order to ease the driver's egress from the vehicle, such as when the driver is severely injured and needs assistance, the tether 18 may be quickly released from the helmet by simply pulling the clip lines 44.

That which is claimed is:

1. A restraint device for controlling a driver's head during a vehicle collision, comprising:
   a member having shoulder portions at least partially positionable on top of at least a portion the shoulders of the driver;
   a tether attached to said member and adapted for being attached to a helmet;
   a strap attached to said member and adapted for being attached to a vehicle's seat belt assembly; and
   wherein the seat belt assembly serves as an anchor to control movement of the driver's head during a vehicle collision when said strap is attached to the seat belt assembly.

2. The restraint device in accordance with claim 1 wherein at least a portion of said strap is positioned between the driver's legs when said restraint device is in position on the driver.

3. The restraint device in accordance with claim 1 wherein at least a portion of said strap is positioned over the waist of the driver when said restraint device is in position on the driver.

4. The restraint device in accordance with claim 1 wherein the seat belt assembly includes a coupling means and said strap is adapted to be attached to said coupling means.

5. The restraint device in accordance with claim 1 wherein the seat belt assembly includes a lap belt and said strap is adapted to be attached to the seat belt assembly by the lap belt.

6. The restraint device in accordance with claim 1 wherein the seat belt assembly includes a shoulder belt and said strap is adapted to be attached to the seat belt assembly by the shoulder belt.

7. The restraint device in accordance with claim 1 wherein the seat belt assembly includes a sub-belt and said strap is adapted to be attached to the seat belt assembly by the sub-belt.

8. The restraint device in accordance with claim 1 wherein said shoulder portions are rearward of and terminate prior to the driver's clavicle when the device is in position on the driver.

9. The restraint device in accordance with claim 1 wherein said shoulder portions are not positioned on the driver's clavicle when the device is in position on the driver.

10. The restraint device in accordance with claim 1 wherein the angle of said tether from the member to the helmet is forwards and upwards when the device is attached to said helmet during use.

11. The restraint device in accordance with claim 10 wherein the angle of said tether from the member to the helmet is between 30° and 40°.

12. The restraint device in accordance with claim 11 wherein the angle of the tether from the member to the helmet is inwards.

13. A restraint device for controlling a driver's head during a vehicle collision, comprising:
   a member having shoulder portions at least partially positionable on top of at least a portion of the shoulders of the driver;
   a tether attached to said member and adapted for being attached to a helmet;
   a strap attached to said member and adapted for being attached to a part of the driver's body; and
   wherein the driver's body serves as an anchor to control movement of the driver's head during a vehicle collision when said device is being worn by the driver.

14. The restraint device in accordance with claim 13 wherein the part of the driver's body to which said strap is attached and which serves as an anchor is the driver's legs.

15. The restraint device in accordance with claim 13 wherein the part of the driver's body to which said strap is attached and which serves as an anchor is the driver's torso.

16. The restraint device in accordance with claim 13 wherein the angle of said tether from the member to the helmet is forwards and upwards when the device is attached to said helmet during use.

17. A restraint device for controlling a driver's head during a vehicle collision, comprising:
- a member having shoulder portions at least partially positionable over the shoulders of the driver;
- a tether attached to said member and adapted for being attached to a helmet;
- a strap attached to said member and adapted for being attached to a vehicle's seat belt assembly;
- wherein the seat belt assembly serves as an anchor to control movement of the driver's head during a vehicle collision when said strap is attached to the seat belt assembly;
- wherein the seat belt assembly includes a coupling means and said strap is adapted to be attached to said coupling means; and
- wherein the driver is freed from being secured to the vehicle by uncoupling said coupling means.

18. A restraint device for controlling a driver's head during a vehicle collision, comprising:
- a member having shoulder portions at least partially positionable over the shoulders of the driver;
- a tether attached to said member and adapted for being attached to a helmet;
- a strap attached to said member and adapted for being attached to a vehicle's seat belt assembly;
- wherein the seat belt assembly serves as an anchor to control movement of the driver's head during a vehicle collision when said strap is attached to the seat belt assembly; and
- wherein the shoulder portions are adapted to engage the seat belt assembly shoulder belts.

19. The restraint device in accordance with claim 18 wherein the seat assembly shoulder belts react against the shoulder portions during a collision event.

* * * * *